(12) United States Patent
Suzuki (10) Patent No.: US 8,379,137 B2
(45) Date of Patent: Feb. 19, 2013

(54) IMAGING APPARATUS (75) Inventor: Shoichi Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 983 days.

(21) Appl. No.: 11/623,668

(22) Filed: Jan. 16, 2007

(65) Prior Publication Data

US 2007/0188630 A1 Aug. 16, 2007

(30) Foreign Application Priority Data

Feb. 10, 2006 (JP) ................................. 2006-034031

(51) Int. Cl.
*H04N 5/232* (2006.01)
(52) U.S. Cl. ........................................................ 348/347
(58) Field of Classification Search ............. 348/240.99, 348/347, 345, 349, 230.1, 240.1–240.3
See application file for complete search history.

(56) References Cited

U.S. PATENT DOCUMENTS

| | | | | |
|---|---|---|---|---|
| 6,166,770 A * | 12/2000 | Yasuda | ........................ | 348/350 |
| 6,522,360 B1 * | 2/2003 | Miyawaki et al. | ............ | 348/347 |
| 6,906,751 B1 * | 6/2005 | Norita et al. | .................. | 348/349 |
| 7,046,290 B2 * | 5/2006 | Nozaki | ......................... | 348/350 |
| 7,154,542 B1 * | 12/2006 | Yuki et al. | .................. | 348/229.1 |

FOREIGN PATENT DOCUMENTS

| JP | 2000-209509 A | | 7/2000 |
|---|---|---|---|
| JP | 2001078081 A | * | 3/2001 |

* cited by examiner

*Primary Examiner* — Chieh M Fan
*Assistant Examiner* — Ahmed A Berhan
(74) *Attorney, Agent, or Firm* — Canon USA Inc IP Division

(57) ABSTRACT

An imaging apparatus includes an imaging unit configured to photoelectrically convert an object image projected on an imaging region and to output a photoelectrically converted electrical signal starting with a selected one of a plurality of predetermined reading start positions; an electronic zooming processing unit configured to perform an electronic zooming process based on an electrical signal output from the imaging unit; a focus adjustment processing unit configured to detect a signal for focus adjustment based on an electrical signal output from the imaging unit at timing different from that of outputting of the electrical signal used in the electronic zooming process; and a control unit configured to set at least one of the plurality of predetermined reading start positions as a reading start position common to the electrical signal used in the electronic zooming process and the electrical signal used in the focus adjustment.

1 Claim, 8 Drawing Sheets

IMAGING APPARATUS

BACKGROUND OF THE INVENTION

1. Field of the Invention

The present invention relates to a technique for reading a signal from an image sensor in an imaging apparatus.

2. Description of the Related Art

In recent years, the digitization of imaging apparatuses, such as digital cameras or digital video cameras, has become common and a method of recording an image of an object, as an image signal, on a recording medium using a highly integrated camera has been actively used. In the cameras (imaging apparatuses), automatic focusing (AF) and electronic zooming are electronically set and performed.

For AF, there is a method of reading an object as an image signal, measuring a position of a lens where the object is in focus while changing the lens position, to set the lens in an optimum position, and, when a shutter button is pressed, performing photographing in that lens position. In this type of AF method, since it is highly possible that an object is present in the center of a screen, signals from a region in the vicinity of the center of the screen are taken out to detect a focusing state, and, based on a result of the detection, an optimum position of the lens is obtained to perform photographing.

For electronic zooming, signals from a region at the center of an image sensor and on the periphery of the central are obtained to perform zooming to a screen size using a zoom controller, so that a zoomed image can be obtained.

Meanwhile, in imaging apparatuses, in order to increase resolution, a reduction in the cell size of an image sensor using a fine processing technology is being vigorously performed. Attention is being given to an amplification-type imaging apparatus configured to amplify a signal and output the amplified signal so as to solve a problem of a decrease in output signal level due to a reduction in cell size of the image sensor. Such an amplification-type imaging apparatus includes, for example, an imaging apparatus having mounted thereon an XY address-type sensor, such as a base-stored image sensor (BASIS), a metal-oxide semiconductor (MOS) sensor, a silicon intensified target vidicon (SIT), an amplified MOS imager (AMI), or a charge modulation device (CMD). These image sensors have a feature of being able to capture an image signal from an arbitrary region of the image sensor. For example, Japanese Patent Application Laid-Open No. 2000-209509 discusses an imaging apparatus capable of outputting signals from an arbitrary region of an image sensor during AF to implement high-speed AF.

In an image sensor, such as the one described above, that is capable of performing fast reading of a necessary screen region by capturing signals from an arbitrary region of the image sensor, a signal reading start position or a signal reading end position can be defined to enable capturing of an image from an arbitrary region of the image sensor. However, if the number of defined signal reading start positions or signal reading end positions increases, the size of an imaging apparatus increases accordingly which works against fulfilling miniaturization of the imaging apparatus.

SUMMARY OF THE INVENTION

The present invention is directed to achieving miniaturization of an imaging apparatus having a high-speed AF function by efficiently reducing the number of defined signal reading start positions or signal reading end positions.

According to an aspect of the present invention, an imaging apparatus in which an electrical signal reading start position in an imaging region is restricted to a plurality of predetermined reading start positions includes an imaging unit configured to photoelectrically convert an object image projected on the imaging region and to output a photoelectrically converted electrical signal starting with a selected one of the plurality of predetermined reading start positions, an electronic zooming processing unit configured to perform an electronic zooming process based on an electrical signal in a first frame output from the imaging unit, a focus adjustment processing unit configured to detect a signal for focus adjustment based on at least a part of an electrical signal within the imaging region in a second frame output from the imaging unit at timing different from that of outputting of the electrical signal used in the electronic zooming process, the second frame being different from the first frame, and a control unit configured to set at least one of the plurality of predetermined reading start positions of the imaging unit as a reading start position common to the electrical signal used in the electronic zooming process and the electrical signal used in the focus adjustment.

According to another aspect of the present invention, an imaging apparatus in which an electrical signal reading start position in an imaging region is restricted to a plurality of predetermined reading start positions includes an imaging unit configured to photoelectrically convert an object image projected on the imaging region and to output a photoelectrically converted electrical signal starting with a selected one of the plurality of predetermined reading start positions, an electronic zooming processing unit configured to perform an electronic zooming process based on an electrical signal within the imaging region in a first frame output from the imaging unit, a focus adjustment processing unit configured to detect a signal for focus adjustment based on at least a part of an electrical signal within the imaging region in a second frame output from the imaging unit at timing different from that of outputting of the electrical signal used in the electronic zooming process, the second frame being different from the first frame, and a control unit configured to set a reading start position for the electrical signal used in the electronic zooming process to either a boundary of a predetermined region from which at least the electrical signal used in the focus adjustment is output or an outside of the predetermined region.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features and aspects of the present invention and, together with the description, serve to explain the principles of the invention.

DETAILED DESCRIPTION OF THE EMBODIMENTS

Various exemplary embodiments, features and aspects of the invention will be described in detail below with reference to the drawings.

First Exemplary Embodiment

Figure 1:
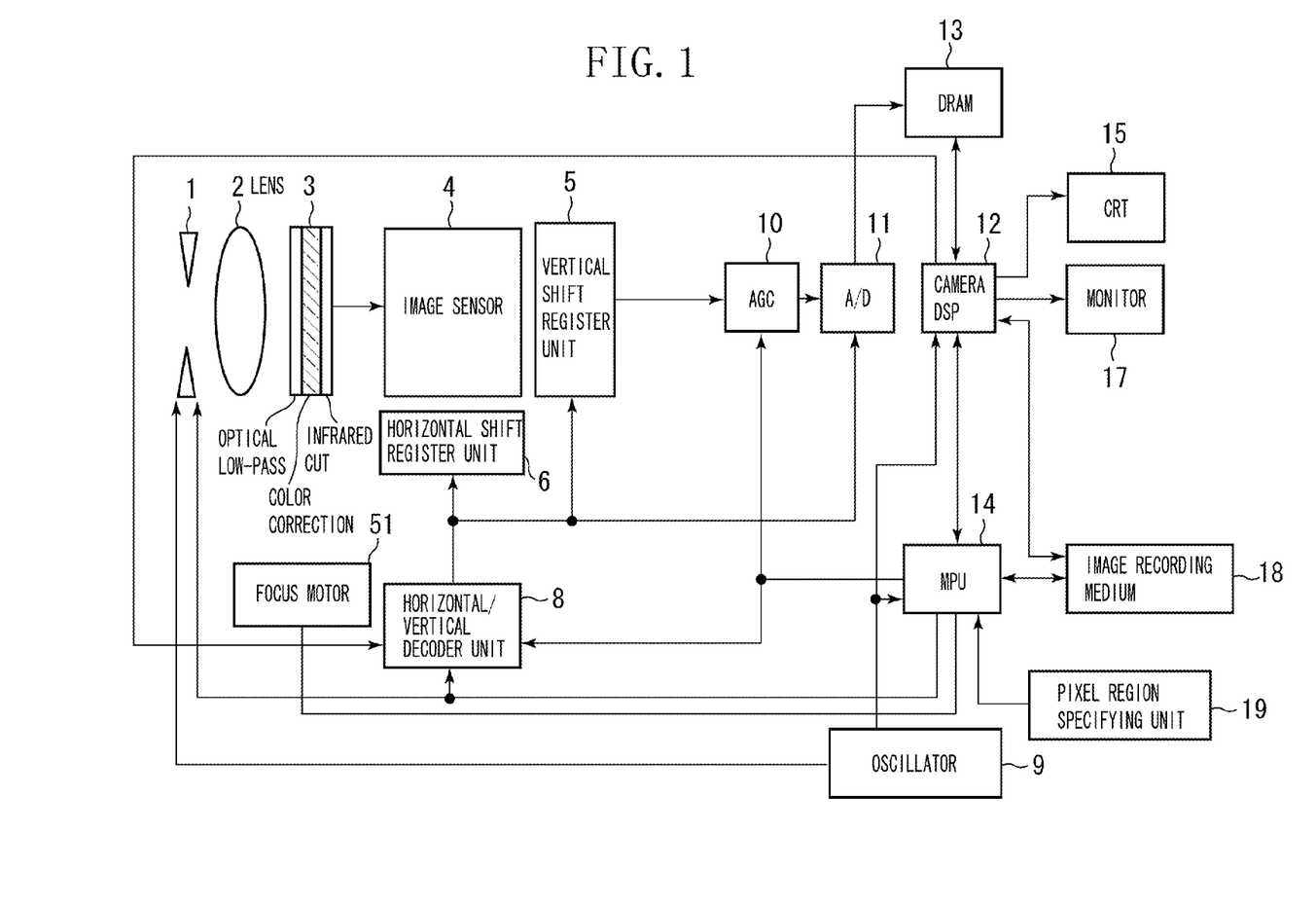
FIG. 1 is a diagram illustrating an exemplary configuration of an imaging apparatus according to an exemplary embodiment of the present invention.

FIG. 1 is a diagram illustrating an exemplary configuration of an imaging apparatus according to an exemplary embodiment of the present invention. Photoelectric conversion is performed such that light from an object passes through diaphragm blades 1 and an image is formed on an image sensor 4 by a lens 2. Here, optical components such as the diaphragm blades 1 and the lens 2 are referred to as an optical system. A filter group 3 includes a combination of an optical low-pass filter that cuts high frequencies of light to prevent moire or the like, a color correction filter, and an infrared cut filter that cuts infrared rays.

An image signal generated by the image sensor 4 is subjected, according to a signal from a horizontal/vertical decoder unit 8, to a two-dimensional pixel position selection in a horizontal shift register unit 6 and a vertical shift register unit 5 and is then read out to an auto gain control circuit (AGC) 10. The image signal, after its voltage is controlled by the AGC 10, is converted into a digital signal by an analog-to-digital (A/D) converter 11. A camera digital signal processing circuit (DSP) 12 performs image processing on a moving image or a still image. A micro processing unit (MPU) 14 sets parameters to be used in the image processing to the camera DSP 12 and performs an auto exposure (AE) process and an auto focus (AF) process. In addition, the MPU 14 controls electronic zooming based on an instruction from a zoom controller (zoom operation unit) (not shown). AF control is performed by a focus motor 51 moving a focus lens (not shown) included in the lens 2 along the optical axis.

A dynamic random access memory (DRAM) 13 is used as a temporary storage region for use in image processing. An image recording medium 18 is used as a non-volatile storage region. The image recording medium 18 includes, for example, a SmartMedia®, a magnetic tape, and an optical disk.

A cathode-ray tube (CRT) 15 (including a vide encoder) is configured to perform display after the image processing. A monitor 17 includes, for example, a liquid crystal display (LCD). The monitor 17 is used for a user to check an object image before storing the object image on the image recording medium 18. These output devices are not limited to the CRT 15 and the monitor 17 but may include a printer or the like. A pixel region specifying unit 19 is a pointer device that specifies, when a part of the region of the image sensor 4 is read, the position of the part. An oscillator 9 is an integrated timing oscillator that supplies various clock signals to the diaphragm blades 1, the camera DSP 12, and the MPU 14 to integratedly provide timing for each unit.

[Exemplary Operation of Image Sensor]

Figure 2:
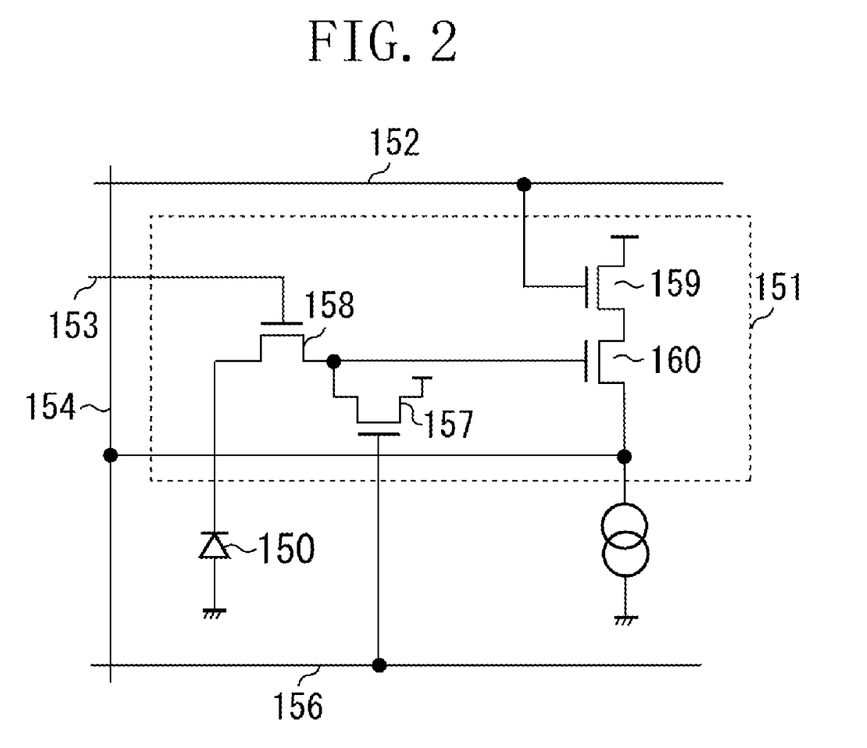
FIG. 2 is a diagram illustrating an exemplary circuit configuration according to an exemplary embodiment of the present invention.

Now, an example operation of the image sensor 4 used in the present exemplary embodiment will be described. Referring to FIG. 2, a photodiode 150 (hereinafter, referred to as a "PD") accumulates charge. The PD 150 photoelectrically converts an object image to output an electrical signal (charge) and thus is also called a photoelectric conversion element. A plurality of photoelectric conversion elements are disposed in a matrix form in the region of the image sensor 4. A MOS transistor 158 for a transfer gate for potential barrier operation is configured to transfer a charge (image signal) accumulated in the PD 150 to a floating diffusion (hereinafter, referred to as an "FD") that is a floating structure of a gate of an amplifying MOS transistor 160. A reset MOS transistor 157 is configured to reset a charge. A MOS transistor 159 is configured for line selection.

The gates of the MOS transistors 158, 157, and 159 are connected to a transfer signal line 153 through which a charge in the PD 150 is transferred, a reset signal line 156 for resetting the FD, and a selection signal line 152, respectively. Charge accumulated in the PD 150 is transferred to the FD, which has been reset via the reset signal line 156 turning on the reset MOS transistor 157. Then, the charge is transferred through the MOS transistor 158 selected via the transfer signal line 153. The charge is then amplified by the source-follower MOS transistor 160 through the MOS transistor 159 selected via the selection signal line 152. The amplified signal is read out to a read line 154. The MOS transistors 157, 159, 159, and 160 are collectively referred to as a pixel amplification unit 151.

Figure 3:
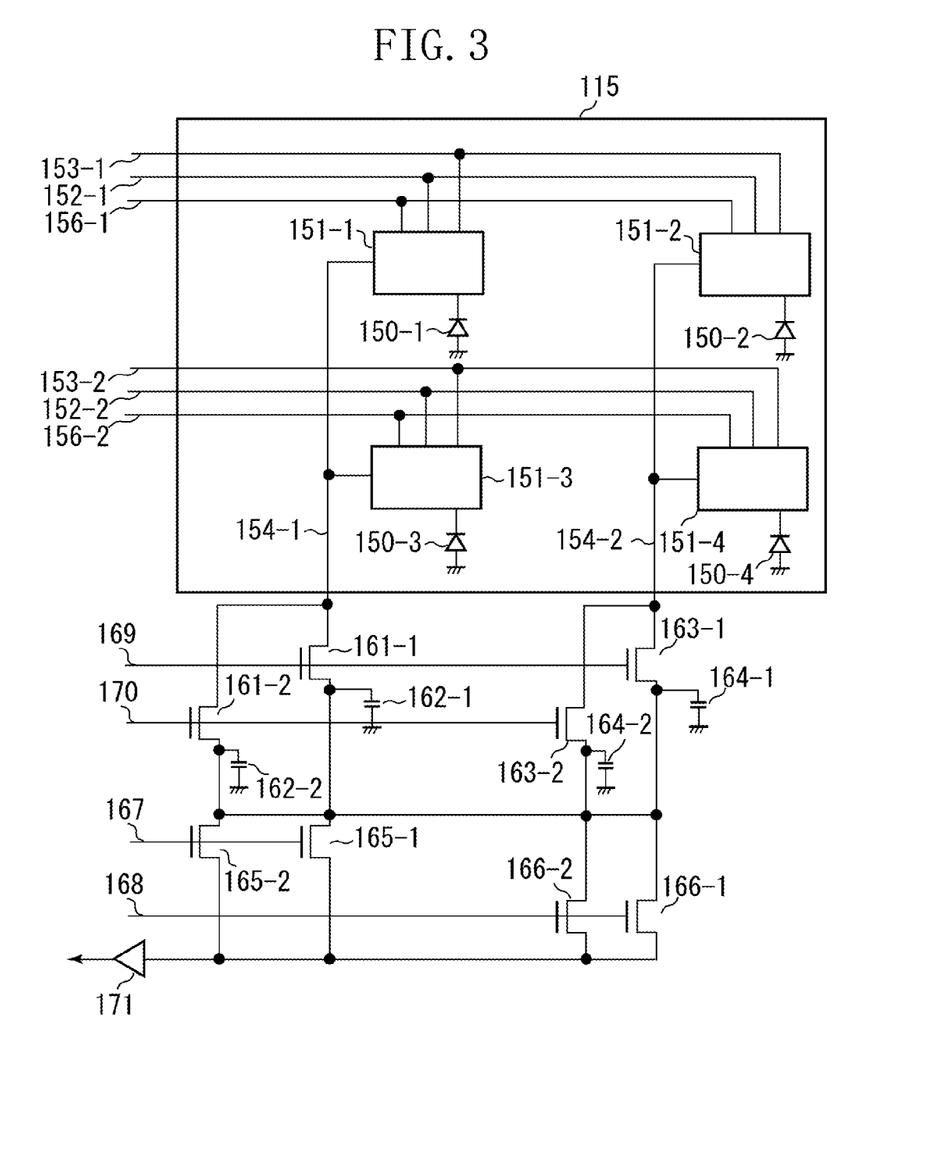
FIG. 3 is a diagram illustrating an exemplary circuit configuration according to an exemplary embodiment of the present invention.

FIG. 3 is a circuit configuration diagram illustrating an example pixel unit 115 and a read circuit. The pixel unit 115 includes a plurality of PDs 150 and a plurality of pixel amplification units 151 which are shown in FIG. 2. For simplification, FIG. 3 only shows 2×2 pixels. Since there are a plurality of PDs and a plurality of pixel amplification units, the PDs 150 are designated by reference numerals 150-1, 150-2, 150-3, and 150-4. The pixel amplification units 151 are designated by reference numerals 151-1, 151-2, 151-3, and 151-4. Referring to FIG. 3, a representative signal reading operation will be described by using, as an example, non-additive control and additive control.

In non-additive control, the pixel amplification unit 151-1 is selected via a selection signal line 152-1. A charge in the PD 150-1 is read out to a read line 154-1 and then transferred to a MOS transistor 161-1. With the MOS transistor 161-1 being turned on via a signal line 169, the charge is accumulated in a capacitor 162-1. Similarly, a charge in the PD 150-2 is read out to a read line 154-2 and then transferred to a MOS transistor 163-1. With the MOS transistor 163-1 being turned on via the signal line 169, the charge is accumulated in a capacitor 164-1. More, specifically, the charges in the PDs 150-1 and 150-2 are read out to the capacitors 162-1 and 164-1, respectively, according to read control of the PD 150-1 via a reset signal line 156-1, a transfer signal line 153-1, the selection signal line 152-1, and the signal line 169. Subsequently, with signal lines 167 and 168 being alternately turned on, image signals from the PDs 150-1 and 150-2 are sequentially read out through an amplifier 171 via MOS transistors 165-1 and 166-1. A scanning operation in a vertical direction is performed in a similar way as the above-described operation according to control via a reset signal line 156-2, a transfer signal line 153-2, a selection signal line 152-2, and a signal line 170 (via MOS transistors 161-2 and 163-2).

In additive control, charges in the PDs 150-1 and 150-2 are accumulated in the capacitors 162-1 and 164-1, respectively, according to control via the reset signal line 156-1, the transfer signal line 153-1, the selection signal line 152-1, and the signal line 169. Subsequently, charges in the PDs 150-3 and 150-4 are accumulated in capacitors 162-2 and 164-2, respectively, according to control via the reset signal line 156-2, the transfer signal line 153-2, the selection signal line 152-2, and the signal line 170. Thereafter, with the signal lines 167 and 168 being simultaneously turned on, an image signal obtained by adding and averaging the charges in the PDs 150-1, 150-2, 150-3, and 150-4 is read out through the amplifier 171 via MOS transistors 165-2 and 166-2. Alternatively, with the signal lines 167 and 168 being simultaneously turned on after signal charges in the PDs 150-1 and 150-4 are accumulated in the capacitors 162-1 and 164-2, an image signal obtained by adding and averaging the charges in the PDs 150-1 and 150-4 is read out through the amplifier 171 via MOS transistors 165-1 and 166-2.

By the above-described control method, non-additive and additive operations can be performed. Note that signal lines such as the selection signal line 152, the reset signal line 156, the transfer signal line 153, and the signal lines 169 and 170 are connected to a vertical shift register unit 5 shown in FIGS. 1 and 4. Signal lines such as the signal lines 167 and 168 are connected to a horizontal shift register unit 6 shown in FIGS. 1 and 4.

Figure 4:
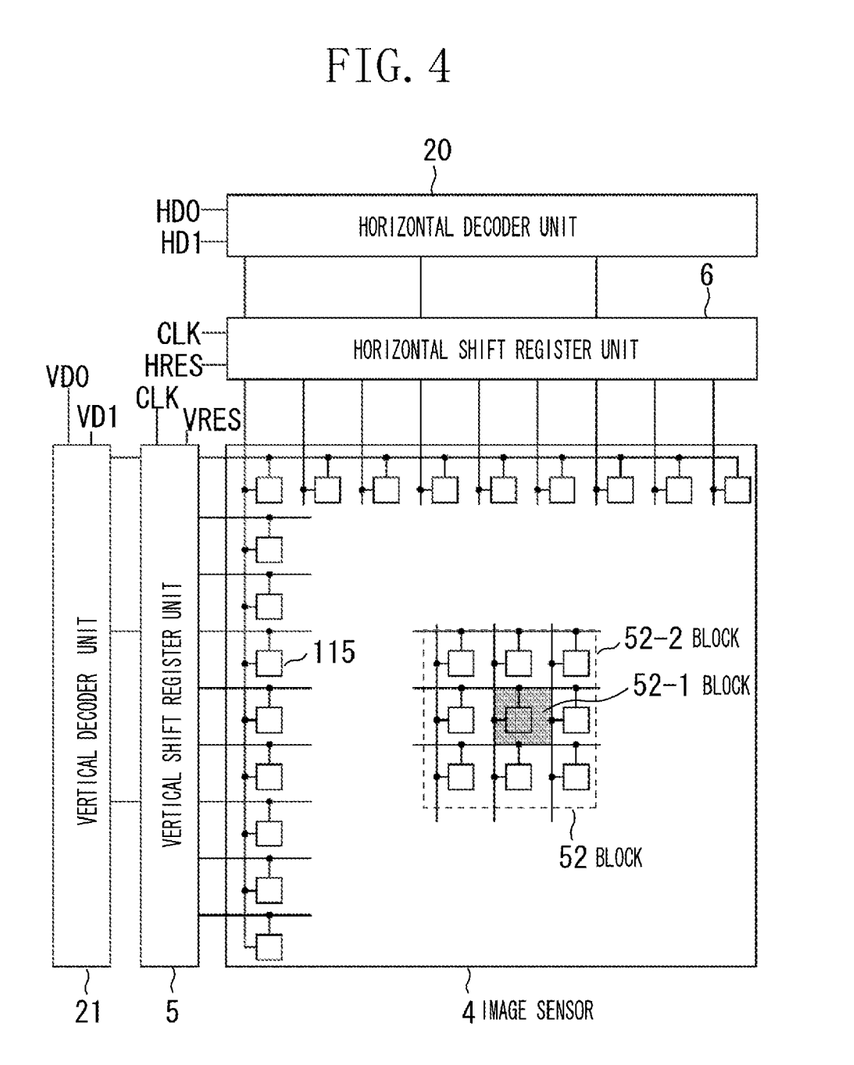
FIG. 4 is a diagram illustrating an example operation for outputting signals from a part of a region of an image sensor according to an exemplary embodiment of the present invention.

FIG. 4 illustrates an example configuration of the image sensor 4 with 9×9 pixels. An operation for outputting signals from a part of the region of the image sensor 4 will be described with reference to FIG. 4. In the illustrated configuration, to specify 9 pixels in each of an X direction and a Y direction, the horizontal shift register unit 6 and the vertical shift register unit 5 are provided. Furthermore, a horizontal decoder unit 20 and a vertical decoder unit 21 are also provided on the outside of the horizontal shift register unit 6 and the vertical shift register unit 5, respectively, so as to specify arbitrary pixel ranges in the shift register units 6 and 5. Pixel units 115 are exemplarily grouped into blocks of 3×3 pixel units.

Control signals HD0 and HD1 can be input to the horizontal decoder unit 20, and a clock pulse CLK and a horizontal reset pulse HRES can be input to the horizontal shift register unit 6. A similar configuration is applied to the case of the vertical direction; specifically, control signals VD0 and VD1 can be input to the vertical decoder unit 21, and a clock pulse CLK and a vertical reset pulse VRES can be input to the vertical shift register unit 5. Since the horizontal unit and the vertical unit are similar, only the horizontal direction will be discussed below.

First, since the inputs HD0 and HD1 to the horizontal decoder unit 20 are two bits, all horizontal 9 pixels cannot be specified only by the inputs HD0 and HD1. However, up to 3 pixels can be directly specified. Hence, in FIG. 4, the horizontal 9 pixels are grouped into three blocks, each including 3 pixels, so that the horizontal decoder unit 8 can specify 3 pixels that are starting pixels in the respective blocks.

The horizontal shift register unit 6 is located between the horizontal decoder unit 20 and the image sensor 4. The horizontal shift register unit 6 can receive starting positions of respective blocks 52 obtained from the horizontal decoder unit 20 and can scan, according to a clock pulse CLK, the image sensor 4 from the respective starting positions on a pixel-by-pixel basis. These starting positions are referred to as "reading start positions". Contents of the horizontal shift register unit 6 can be erased to stop scanning according to a horizontal reset pulse HRES.

A similar configuration as discussed in the horizontal unit can be applied to the vertical decoder unit 21 and the vertical shift register unit 5. Specifically, when selected blocks are selected in a horizontal line arrangement, decoding is performed in a similar manner as described above, and pixel read regions are selected by the vertical shift register unit 5, so that a similar advantageous effect can be obtained in a similar operation.

Now, a signal reading operation for electronic zooming and a signal reading operation for detecting a focusing state (focus detection) used for the above-described AF will be described below.

Figure 5A:
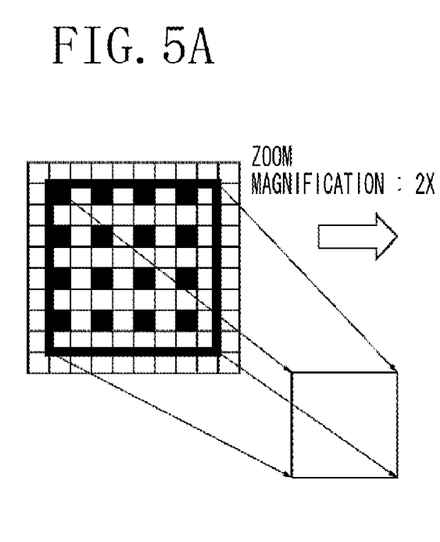
FIGS. 5A and 5B are diagrams illustrating concepts of a signal reading operation for a normal mode and a signal reading operation for electronic zooming, respectively, according to an exemplary embodiment of the present invention.
Figure 5B:
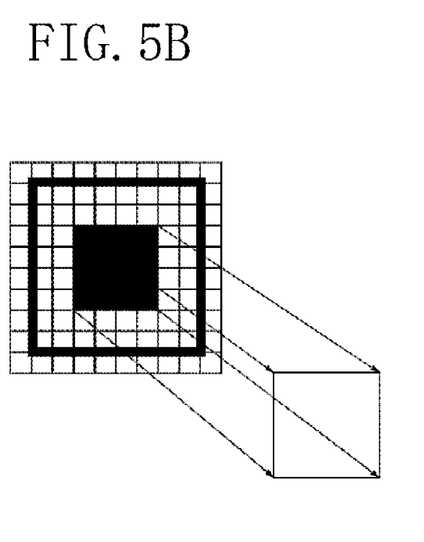

First, referring to FIGS. 5A and 5B, an exemplary reading operation for normal mode and a reading operation for electronic zooming mode will be described. FIG. 5A illustrates the reading operation for normal mode and FIG. 5B illustrates the reading operation for electronic zooming mode. In normal mode (e.g., when the zoom magnification is 1×), with the above-described additive control used, signals from 4 pixels, for example, of the image sensor 4 are added and output, so that a reading operation is performed with a reduced number of pixels. Conceptually speaking, for a bold-framed range in FIG. 5A, a reading operation for reading signals from solidly shaded pixels, i.e., signals corresponding to 4×4 pixels in an 8×8 vertical/horizontal pixel range for display on a screen, is performed.

On the other hand, in electronic zooming mode (e.g., when the zoom magnification is 2×), with the above-described non-additive control used, signals from contiguous 4×4 pixels in the center of a bold-framed range of 8×8 pixels are read. That is, signals in a predetermined region are read. Thus, an operation for reading signals from solidly shaded pixels in the bold-framed range in FIG. 5B is performed. In the present exemplary embodiment, when a magnification greater than a predetermined zoom magnification is specified, control is performed to read signals from the above-described predetermined range. When a magnification equal to or smaller than the predetermined zoom magnification is specified, control is performed to read signals from the entire region. Accordingly, the number of reading start positions can be restricted, thus resulting in miniaturization of the apparatus.

When signals are read from the predetermined region as described above, the central portion in the bold-framed range can be magnified to be displayed. Moreover, the number of pixels to be read is the same as that for normal mode. Thus, it is not necessary to increase the number of pixels for signal processing. Accordingly, with a reading method such as the one described above used, an image quality during electronic zooming can be enhanced.

[Exemplary Signal Reading Operation]

Figure 6:
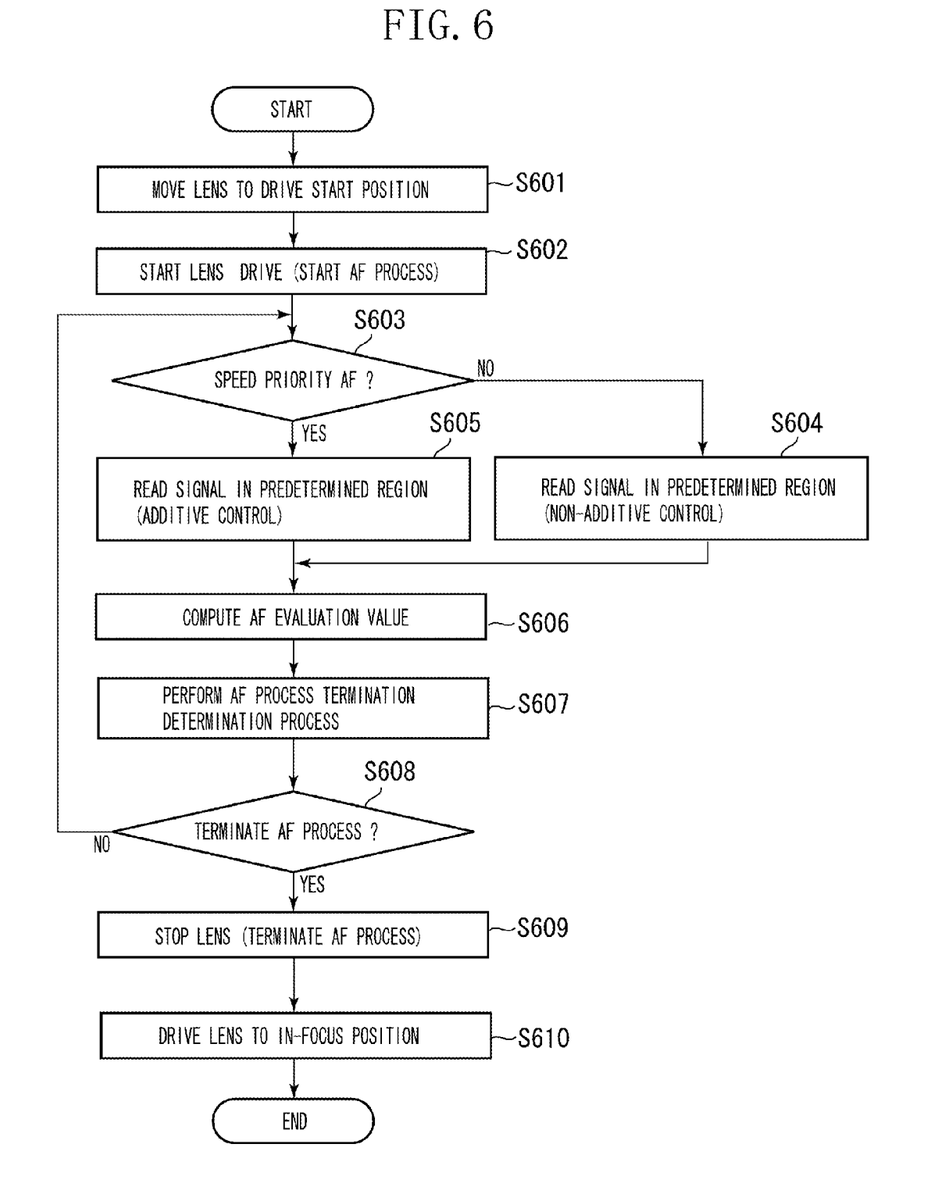
FIG. 6 is a flowchart illustrating an example AF operation according to an exemplary embodiment of the present invention.

An exemplary signal reading operation for detecting a focusing state for AF is now herein described as follows. During an imaging operation, signals are read from a part of the region for AF (AF region). Generally, since it is highly possible that an object is present in the center of the screen, signals in a region in the vicinity of the center of the screen are read. It is assumed that the AF region is set in advance. Reading and AF operations are performed in a manner as illustrated in FIG. 6. When a first stroke (SW1) of a release switch (not shown) is turned on, an AF process is started and an AE process performed. Then, the MPU 14 first drives, at step S601, the lens 2 to a drive start position (e.g., a position corresponding to an infinite distance or a position corresponding to a minimum object distance).

At step S602, the MPU 14 starts driving the lens 2 to obtain an AF evaluation value. First, the MPU 14 determines a drive speed of the lens 2 based on a signal reading time, depth of focus, and the like, and drives, according to on drive speed, the lens 2 towards a drive end position (e.g., a position corresponding to a minimum object distance or a position corresponding to an infinite distance). The MPU 14 drives the lens 2 continuously from the drive start position to the drive end position.

Then, at step S603, the MPU 14 determines whether the AF of the imaging apparatus is set to speed priority or AF accuracy priority. If the setting is speed priority (YES at step S602), then the process proceeds to step S605. If the setting is AF accuracy priority (NO at step S602), then the process proceeds to step S604. At step S605, the MPU 14 reads signals from a region in the vicinity of the center of the screen in the manner described above, with a reduced number of signals by additive control. On the other hand, at step S604, the MPU 14 reads signals in a region in the vicinity of the center of the screen in the manner described above. In the present exemplary embodiment, a reading region for AF is one region in the vicinity of the center of the screen.

Subsequently, at step S606, the MPU 14 obtains an AF evaluation value. The MPU 14 reads, after accumulation is completed in the image sensor 4, only signals in the AF region from the image sensor 4. Then, the signals are subjected to signal processing in the AGC 10 and the A/D converter 11 and then the processed signals are subjected to image processing in the camera DSP 12. In the MPU 14, input signals are received and high-frequency components of the signals for the AF region screen are extracted through a high-pas filter (HPF) or the like, and the signals are further subjected to a computation process such as cumulative addition. Accordingly, an AF evaluation value corresponding to an amount of high-frequency edge components and the like is calculated. Thus, the MPU 14 extracts a predetermined high-frequency component of signals generated by the image sensor 4 and obtains an AF evaluation value.

At step S607, the MPU 14 determines whether to terminate the AF process. When the AF process terminates, a flag to terminate the AF process is set.

Determination to terminate the AF process is made in the following cases (1) and (2):

(1) The lens 2 has reached the drive end position (e.g., a position corresponding to a minimum object distance or a position corresponding to an infinite distance); and (2) A maximum AF evaluation value has been detected and it is determined that even if the AF process continues, a new maximum AF evaluation value cannot be detected.

Then, at step S608, the MPU 14 determines whether the flag to terminate the AF process is set. If the flag to terminate the AF process is not set (NO at step S608), then the process proceeds to step S603 to repeat a similar operation.

On the other hand, if the flag to terminate the AF process is set (YES at step S608), then the process proceeds to step S609. At step S609, the MPU 14 stops driving the lens 2 to terminate the AF process. The MPU 14 then determines, from the AF evaluation value obtained at step S606, an in-focus position and performs a focusing operation to drive the lens 2 to the in-focus position (step S610). Then, in response to a zoom instruction by the zoom controller (zoom operation unit) (not shown), as described above, signal accumulation and reading operations for normal mode or electronic zooming mode are performed. After accumulation has been completed in the image sensor 4, signals read from the image sensor 4 are subjected to A/D conversion and signal processing, and then, further subjected to various image processing.

As described above, in both of a signal reading for electronic zooming where a magnification greater than the predetermined zoom magnification is specified and a signal reading for an AF operation, signals are read from a part of the region of the screen. Hence, in the present exemplary embodiment, when a partial reading is performed, as described in FIG. 4, the same signal reading start position and signal reading end position are used for both a reading region for electronic zooming and a reading region for AF. Accordingly, the circuit configuration of a selection unit for selecting a reading start position for reading signals from the image sensor can be simplified. In addition, since signals are read partially, the AF speed can be increased.

In the above description, a configuration is employed in which, when electronic zooming is performed, a reading mode is changed between reading from the entire region and reading from the predetermined region according to a zoom magnification. However, a configuration may be employed in which a plurality of reading regions for electronic zooming are set in advance and a common reading region (a common reading start position) can be set for electronic zooming and AF.

Furthermore, a plurality of reading regions for AF can be set, and the position of a boundary or outside of a minimum AF region can be set as a reading start position so as to output at least an image signal in a region including the minimum AF region. Then, a common reading start position can be set for electronic zooming and reading from the minimum AF region. Since the position of the inside of the AF region is not set as a reading start position, wasted wiring for selecting the inside of the AF region becomes unnecessary, thus achieving miniaturization of the apparatus. At this time, signals in a desired region are extracted from read signals, and the extracted signals are used for display, storage, or AF.

As described above, in an imaging apparatus according to the present exemplary embodiment, an electrical signal reading start position in an imaging region is restricted to a plurality of predetermined positions. The imaging apparatus has an image sensor that photoelectrically converts an object image projected on the imaging region and outputs photoelectrically converted electrical signals with one of the predetermined reading start positions being used as a reading start position. Based on electrical signals output from the image sensor, an electronic zooming process is performed. Based on electrical signals output from the image sensor at timing different from that of outputting for the electronic zooming process, a focus adjustment process for detecting signals for focus adjustment is performed. At least one of the predetermined reading start positions in the image sensor is set as a common reading start position between an output reading start position used in the electronic zooming process and an output reading start position used in the focus adjustment.

Accordingly, while an increase in AF speed is achieved, the circuit size of the apparatus can be reduced, thus achieving miniaturization of the apparatus.

Second Exemplary Embodiment

A second exemplary embodiment of the present invention will be described below with reference to the flowchart of FIG. 7. In the following, points of difference between the first exemplary embodiment and the second exemplary embodiment will be mainly described, and similar components and similar processing operations are denoted by the same reference numerals and a detailed description thereof will be omitted.

Figure 7:
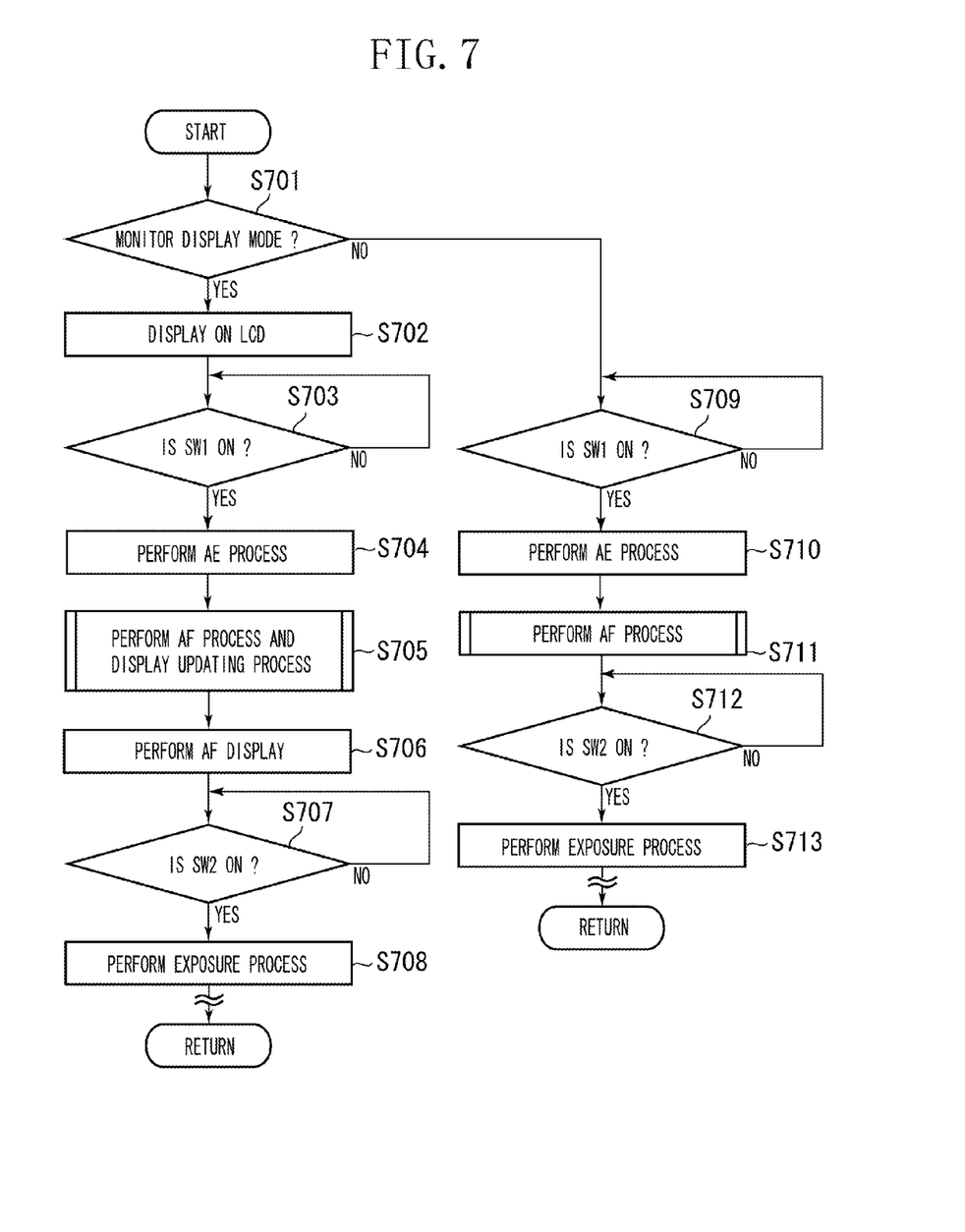
FIG. 7 is a flowchart illustrating an example photographing operation of the imaging apparatus according to an exemplary embodiment of the present invention.

FIG. 7 is a flowchart illustrating a photographing operation of the imaging apparatus shown in FIG. 1 according to the second exemplary embodiment. In the flowchart of FIG. 7, the process proceeds for two different cases, i.e., the case of performing monitor display and the case of not performing monitor display. When a main power supply switch of the imaging apparatus is turned on and the imaging apparatus is in a photographing (recording) mode, a photographing process sequence is performed.

First, at step S701, the MPU 14 determines whether a monitor display setting is ON or OFF. If the monitor display setting is ON (YES at step S701), then the process proceeds to step S702. If the monitor display setting is OFF (NO at step S701), then the process proceeds to step S709. At step S702, the MPU 14 causes an image that has passed through the lens 2 and has been formed on the image sensor 4 to be displayed on the monitor 17. More, specifically, an object image formed on the image sensor 4 is subjected to photoelectric conversion by the image sensor 4 and thereby converted into electrical signals. Then, the electrical signals are output to the camera DSP 12 in the manner described above. Thus, input signals are subjected to various signal processing, so that predetermined signals are generated.

Subsequently, at step S703, the MPU 14 checks the state of the release switch. When the MPU 14 determines that the release switch is operated by a user and the first stroke (SW1) of the release switch is turned on (YES in step S703), the process proceeds to step S704. At step S704, an AE process is performed. Then, an AF process and a display updating process are performed at step S705.

More, specifically, the MPU 14 performs, at step S705, an AF process for detecting a focusing position. AF is performed by determining a position of the lens 2 where the largest amount of high-frequency components which are output from the signals generated by the image sensor 4 is present. During the AF process, updating of a display screen is performed as needed, to prevent an image on the monitor 17 from breaking up. At this time, when zooming is specified by the zoom controller (zoom operation unit) (not shown), a signal reading operation for electronic zooming is performed in the manner as described in the first exemplary embodiment. As a result, with signals read from the predetermined region, signals zoomed to a desired zoom magnification can be obtained.

As a result of AF, if its reliability is sufficient, at step S706, an "AF OK" display is performed. This display is performed by turning on a display element (not shown), and at the same time, displaying a green frame on the screen of the monitor 17. If the reliability is low, at step S706, an "AF NG" display is performed. This display is performed by blinking the display element, and at the same time, displaying a yellow frame on the screen of the monitor 17.

At step S707, the MPU 14 checks a second stroke (SW2) of the release switch. If the second stroke of the release switch is turned on (YES at step S707), then the process proceeds to step S708, where an exposure process is performed. At this time, when zooming is specified by the zoom controller (zoom operation unit) (not shown), a signal reading operation for electronic zooming is performed in the manner as described in the first exemplary embodiment. More, specifically, with signals read from a predetermined region, signals zoomed to a desired zoom magnification can be obtained. Then, image processing, A/D conversion, and the like are performed, and an image display on the monitor 17 and storing of an image on the image recording medium 18 are performed.

Figure 8:
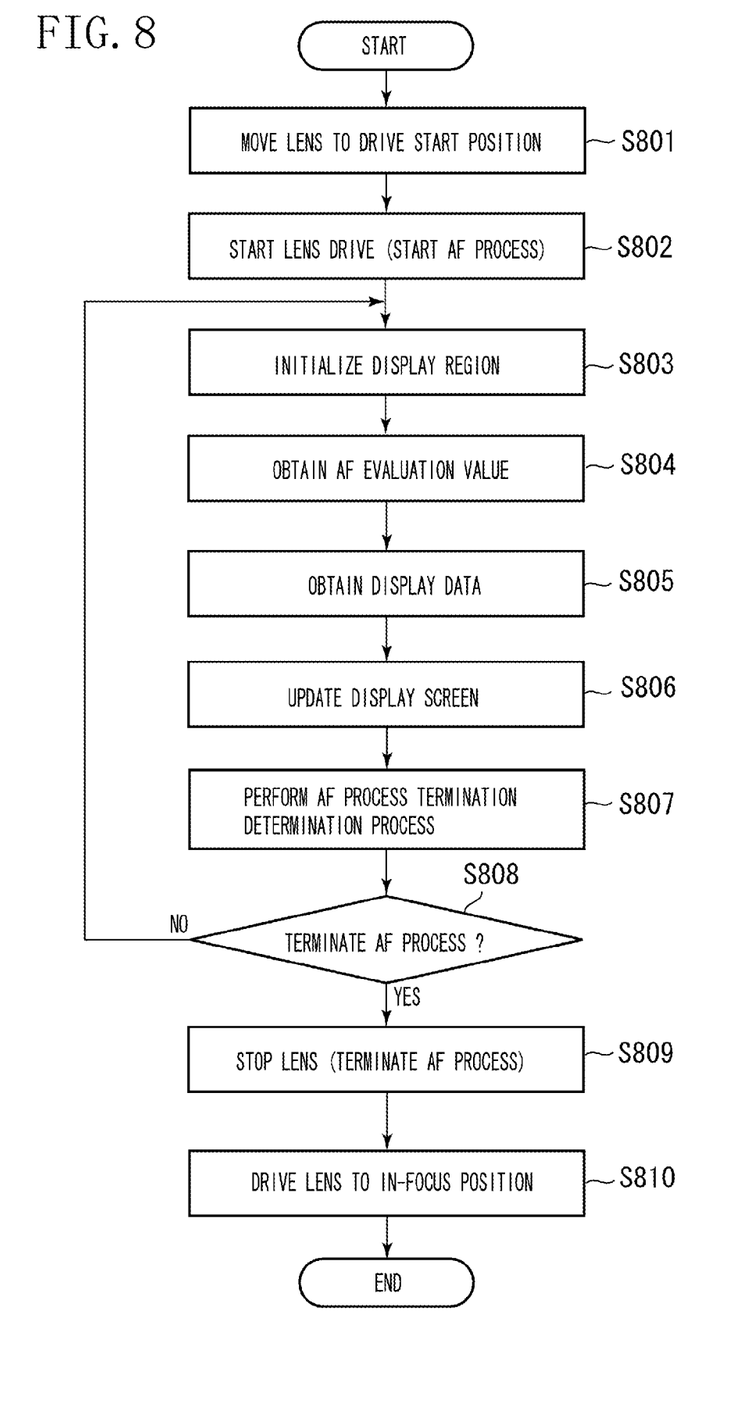
FIG. 8 is a flowchart illustrating an example AF process and a display screen updating process according to an exemplary embodiment of the present invention.

Here, an exemplary AF process and display screen updating process performed at step S705 will now herein be described in detail as shown in FIG. 8. When the first stroke (SW1) of the release switch is turned ON, an AF process is started and an AE process is performed. Then, the MPU 14 first drives, at step S801, the lens 2 to a drive starting position (e.g., a position corresponding to an infinite distance or a position corresponding to a minimum object distance).

At step S802, the MPU 14 starts driving the lens 2 to obtain an AF evaluation value. First, the MPU 14 determines a drive speed of the lens 2 based on a signal reading time, depth of focus, and the like, and drives, according to the drive speed, the lens 2 towards a drive end position (e.g., a position corresponding to a minimum object distance or a position corresponding to an infinite distance). The MPU 14 drives the lens 2 continuously from the drive start position to the drive end position.

At step S803, the MPU 14 initializes a signal reading region for monitor display. Then, at step S804, the MPU 14 obtains an AF evaluation value. The MPU 14 reads, after accumulation is completed in the image sensor 4, signals in the entire screen region from the image sensor 4. At this time, when zooming is specified by the zoom controller (not shown), a signal reading operation for electronic zooming is performed in the manner as described in the first exemplary embodiment. The signals are subjected to A/D conversion, signal processing, and the like, and then output to the MPU 14. In the MPU 14, input digital signals are received and high-frequency components of signals for an AF region are extracted through a high-pass filter (HPF) or the like, and the signals are further subjected to a computation process such as cumulative addition. Accordingly, an AF evaluation value corresponding to an amount of high-frequency edge components and the like is calculated. Thus, the MPU 14 extracts a predetermined high-frequency component of signals generated by the image sensor 4 and obtains an AF evaluation value.

After accumulation has been completed in the image sensor 4, signals in the entire screen region having read from the image sensor 4 are subjected to A/D conversion and signal processing. At this time, when zooming is specified by the zoom controller (not shown), A/D conversion and signal processing for electronic zooming are performed in the manner as described in the first exemplary embodiment. Thereafter, various image processing is further performed. Then, after the signals are converted into video signals in a suitable form for display (step S805), the signals are displayed on the monitor 17 as an image (step S806). That is, at this stage, an image displayed on the monitor 17 is updated.

When the image displayed on the monitor 17 has been updated, the process proceeds to step S807. At step S807, the MPU 14 determines whether to terminate the AF process.

Determination to terminate the AF process is made in the following cases (1) and (2):

(1) The lens 2 has reached the drive end position (e.g., a position corresponding to a minimum object distance or a position corresponding to an infinite distance); and (2) A maximum AF evaluation value has been detected and it is determined that even if the AF process continues, a new maximum AF evaluation value cannot be detected.

If a result of the termination determination at step S807 is "not terminate" (NO at step S808), then the process proceeds to step S803, where the MPU 14 initializes the signal reading region for monitor display. Then, the MPU 14 repeats a similar operation and obtains an AF evaluation value (step S804) and signals for monitor display (step S805). When the signals for monitor display have been obtained, the image on the monitor 17 is updated (step S806).

On the other hand, if a result of the termination determination at step S807 is "terminate" (YES at step S808), then the process proceeds to step S809. At step S809, the MPU 14 stops driving the lens 2 to terminate the AF process. At step S810, the MPU 14 determines, from the AF evaluation value obtained at step S804, an in-focus position and performs a focusing operation to drive the lens 2 to the in-focus position.

Referring back to FIG. 7, the case will be described in which the monitor display setting is determined to be OFF at step S701. If the monitor display setting is OFF (NO in step S701), then the process proceeds to step S709. At step S709, the MPU 14 checks the state of the release switch. When the MPU 14 determines that the release switch is operated by a user and the first stroke (SW1) of the release switch is turned on (YES in step S709), the process proceeds to step S710. At step S710, an AE process is performed. Then, an AF process is performed at step S711. The AF process at step S711 is similar to the operation in FIG. 6, and thus a description thereof is omitted.

Next, the MPU 14 checks, at step S712, the second stroke (SW2) of the release switch. If the second stroke is turned ON (YES at step S712), then the process proceeds to step S713. At step S713, an exposure process is performed. At this time, when zooming is specified by the zoom controller (zoom operation unit) (not shown), a signal reading operation for electronic zooming is performed in the manner as described in the first exemplary embodiment. Specifically, with signals read from the predetermined region, signals zoomed to a desired zoom magnification can be obtained. Then, image processing, A/D conversion, and the like are performed, and an image display on the monitor and storing of an image on the image recording medium 18 are performed.

As described above, when monitor display is performed, signals are read from the entire screen region, and among the read signals, signals in a partial region for determining a focusing state in AF are also obtained. When monitor display is not performed, signals for determining a focusing state in AF are obtained by reading from the partial region. With this configuration, desired signals can be efficiently obtained. For a reading method, when monitor display is performed, both signals for display and signals for AF are generated from signals read with a reduced number of signals by additive control. Thus, when monitor display is not performed, the accuracy of signals for AF in the case of speed priority is the same as that obtained when monitor display is performed. On the other hand, in the case of AF accuracy priority, the accuracy is higher when monitor display is not performed than when monitor display is performed. Thus, the imaging apparatus has a first mode in which monitor display is performed and a second mode in which monitor display is not performed. In the first mode, a reading start position is changed according to a magnification of electronic zooming and electrical signals are output from the image sensor. In the second mode, without changing a reading start position according to a magnification of electronic zooming, electrical signals are output from the image sensor. Accordingly, an AF operation appropriate for a given mode can be performed.

The reading start position is set to the position of a boundary or outside of an AF region so as to output at least an image signal in a region including the AF region (focus detection region). Then, a common reading start position can be set for electronic zooming and reading from the AF region. Since the position of the inside of the AF region is not set as a reading start position, wasted wiring for selecting the inside of the AF region becomes unnecessary, thus achieving miniaturization of the apparatus. In addition, since at least signals in the AF region are configured to be read, while AF accuracy is maintained, an increase in processing speed can be achieved. Now, a description for the outside, inside, and boundary of the AF region is provided below with reference to FIG. 4 as an example. The block 52 in FIG. 4 corresponds to an AF region. The inside of the AF region corresponds to a block 52-1. The boundary of the AF region corresponds to a block 52-2. Thus, the boundary of the AF region indicates a frame of the AF region and the inside of the AF region indicates a region inside the frame.

In the above description, a reading method in which the number of signals is reduced by additive control is employed as an example. Instead of this, a thinning-out reading method can be employed in which the amount of signal is reduced by thinning out signals, thus also resulting in miniaturization of the apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-034031 filed Feb. 10, 2006, which is hereby incorporated by reference herein in its entirety.

What is claimed:

1. An imaging apparatus comprising:
    an imaging unit in which a plurality of pixels are arranged in matrix form and configured to output an electrical signal by performing a photoelectric conversion of an object image; and
    a control unit configured to control to read a first electrical signal at a first timing from the pixels in a focus adjustment region of the imaging unit and perform a focus adjustment processing on the basis of the read first electrical signal, and control to perform an electronic zooming processing by reading a second electrical signal at a second timing which is different from the first timing from the pixels in an electric zooming region of the imaging unit after performing the focus adjustment processing,
    wherein the control unit can set a plurality of focus adjustment regions of the imaging unit, and controls so that a reading start pixel position of the first electrical signal from a minimum focus adjustment region of the plurality of focus adjustment regions of the imaging unit, and a reading start pixel position of the second electrical signal from the electronic zooming region of the imaging unit, to be the same,
    wherein the control unit controls so as not to set inside of the minimum focus adjustment region as the reading start pixel position of the second electrical signal.

* * * * *